UNITED STATES PATENT OFFICE.

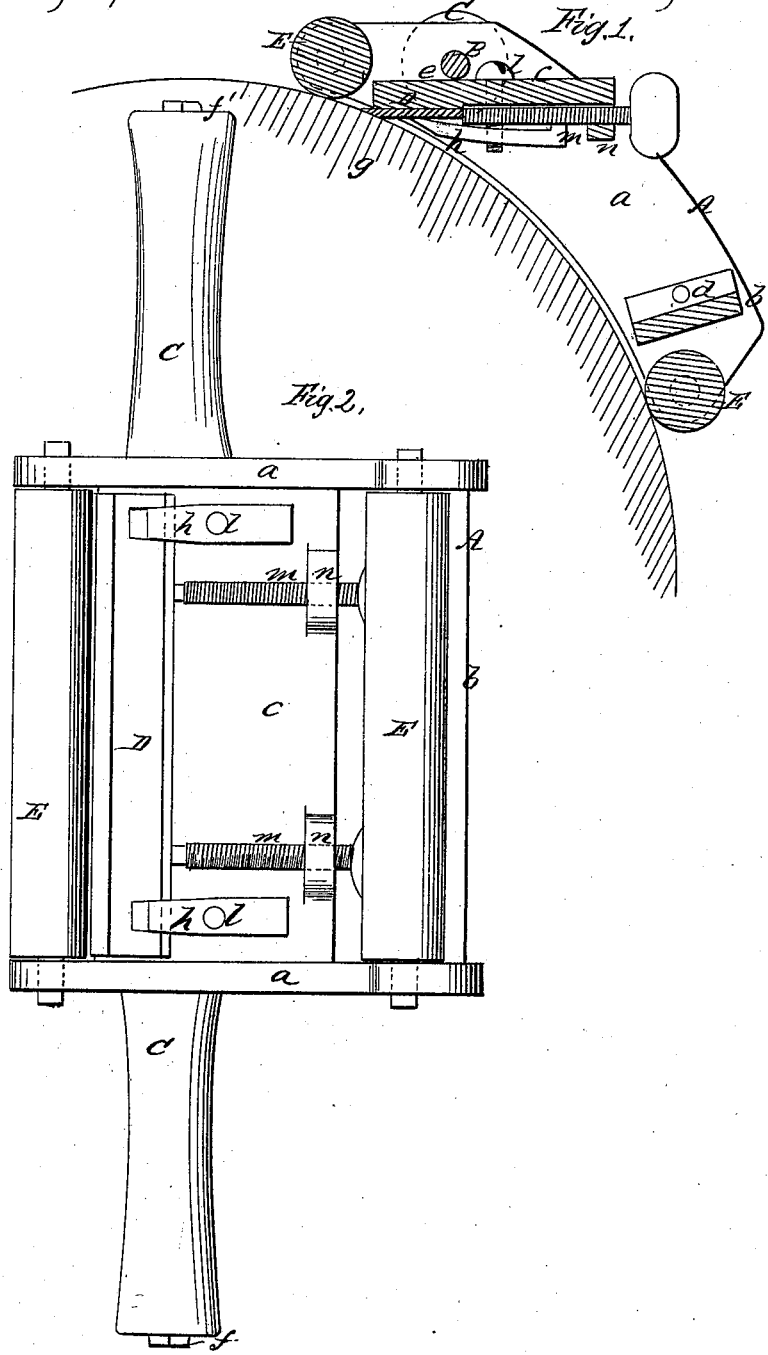

LYMAN JENNINGS, OF ERVING, MASSACHUSETTS.

HOLDER FOR PLANING-KNIVES WHILE GRINDING.

Specification of Letters Patent No. 19,641, dated March 16, 1858.

*To all whom it may concern:*

Be it known that I, LYMAN JENNINGS, of Erving, in the county of Franklin and State of Massachusetts, have invented a new and Improved Implement or Device for Holding Planing Knives or Cutters and other Cutting Tools While Being Ground; and I do hereby declare that the following is a full, clear, and exact description of the same, reference being had to the annexed drawings, making a part of this specification, in which—

Figure 1, is a vertical central section of my improvement with a planing knife secured within it and the implement applied to a grind stone. Fig. 2 is a detached inverted plan of ditto.

Similar letters of reference indicate corresponding parts in the two figures.

This invention consists in having a clamp secured in a frame provided with rollers, one or more, and with handles, so that the cutter or tool to be ground, may be firmly secured in the clamp and the cutter or tool, by applying the frame to the stone, ground in a perfect manner.

The invention is more particularly designed for holding knives or cutters which in order to work perfectly should have the bevels that form their cutting edges at a certain angle and which should also have perfectly straight cutting edges.

To enable those skilled in the art to fully understand and construct my invention I will proceed to describe it.

A, represents a frame which is constructed of two parallel bars (*a*) (*a*) connected by a crossbar (*b*), at one end, and a plate (*c*) at the opposite end. The above parts are of metal and the bar (*b*) is secured to the bars (*a*) (*a*) by screws (*d*). The plate (*c*) however is secured in proper position by a rod B, which passes through lugs or ears (*e*) (*e*) at the ends of the plate (*c*) and through handles C, C, at the outer sides of the bars (*a*) a handle being to each bar, one end of the rod B, being provided with a bead (*f*) and the opposite end with a nut (*f'*), see Fig. 2.

The plate (*c*) is fitted between the bars (*a*), (*a*), in an oblique position compared with the curvature of the bars, that is to say, said plate differs considerably from a radial position. This will be understood by referring to Fig. 1, in which the red circle (*g*) is concentric with the circle of which the bars (*a*) form a part. To the under side of the plate (*c*) two clamps (*h*), (*h*), are attached by screws (*l*), (*l*), which pass through the plate (*c*), and (*m*) (*m*) are two thumb screws which pass through lugs or ears (*n*), (*n*), at the outer edge of the plate (*c*). The inner edge of the plate (*c*) is made flush with the inner edges of the bars (*a*) (*a*).

D, is a cutter or knife which is secured to the under side of the plate (*c*) by means of the clamps (*h*), (*h*). The cutter or knife is adjusted by means of the thumb screws (*m*) (*m*) so that its edge will be parallel with the inner edge of the plate (*c*). At each end of the frame A, a roller E, is placed, the peripheries of which project a trifle below the under surface of the bars (*a*), (*a*). The rollers are parallel with the bar (*b*) and plate (*c*).

The implement is used as follows: The knife or cutter D, is secured to the under side of the plate (*c*) by means of the clamps (*h*) (*h*) and is adjusted by the screws (*m*) (*m*) so that its edge will be parallel with the inner edge of plate (*c*) and the upper edge of its inner end in contact with the inner edge of plate (*c*). The implement is then applied to the stone (*g*) shown in red, by the operater who grasps each handle C, C, and the stone acts upon the inner edge of the knife or cutter D, until the same is cut away sufficiently to allow the rollers E, E, to come in contact with it, the stone will then of course cease to act upon the knife and the work is completed, the knife being perfectly ground to a cutting edge with a bevel of proper inclination.

By this improvement the bevels of the knives will always be ground at the same angle and the cutting edges will always be perfectly straight. The stone also does not require to be perfectly round as in other implements for the same purpose, for as my implement is held by the hands of the operator it may rise and fall to conform to the inequalities of the stone. The implement may be used for holding all knives or cutters having straight cutting edges, as the cutters for planing machines and the like and various hand tools used by different mechanics.

I would remark that a roller E, may be used at one end only of the machine, but I prefer two, one at each end as herein shown.

Having thus described my invention what

I claim as new and desire to secure by Letters Patent, is,

The frame A, provided with the rollers E, E, one or more, and the plate (c), clamps (h), (h), and adjusting screws (m), (m), or their equivalents for securing and adjusting the knife or cutter D, in the frame, substantially as and for the purpose set forth.

LYMAN JENNINGS.

Witnesses:
W. B. WASHBURN,
WM. YOUNG.